United States Patent [19]

Ezaki et al.

[11] Patent Number: 4,808,334

[45] Date of Patent: Feb. 28, 1989

[54] PRODUCTION OF STERILE COMPOSITE EMULSION

[75] Inventors: Mitsuo Ezaki, Izumisano; Makoto Kobayashi; Tsuguo Izumi, both of Sennan, all of Japan

[73] Assignee: Fuji Oil Company, Ltd., Osaka, Japan

[21] Appl. No.: 71,256

[22] Filed: Jul. 8, 1987

[30] Foreign Application Priority Data

Jul. 11, 1986 [JP] Japan .................................. 61-164268

[51] Int. Cl.$^4$ ........................... A23D 3/00; B01J 13/00
[52] U.S. Cl. .................................... 252/314; 252/309; 252/312; 426/570; 426/602
[58] Field of Search ................. 252/312, 314; 426/570, 426/602

[56] References Cited

U.S. PATENT DOCUMENTS

| | | | |
|---|---|---|---|
| 3,310,408 | 3/1967 | Hansen | 426/653 |
| 3,823,091 | 7/1974 | Samejima et al. | 252/312 |
| 3,993,581 | 11/1976 | Yokoyama et al. | 252/312 |
| 4,157,982 | 6/1979 | Clemons et al. | 252/311 |
| 4,290,910 | 9/1981 | Harada et al. | 252/312 |
| 4,380,503 | 4/1983 | Koerner | 252/314 |
| 4,425,369 | 1/1984 | Sakamoto et al. | 426/602 X |
| 4,590,086 | 5/1986 | Takahashi et al. | 426/602 |
| 4,606,913 | 8/1986 | Aronson et al. | 424/59 |

*Primary Examiner*—Richard D. Lovering
*Attorney, Agent, or Firm*—Wenderoth, Lind & Ponack

[57] ABSTRACT

A sterile composite emulsion useful for food such as cream which comprises an aseptic homogeneous mixture of oil and/or aqueous phases, and a primary emulsion thereof, said oil and/or aqueous phases and said primary emulsion being separately treated by ultra-high temperature heating sterilization. A process for producing the same is also disclosed.

1 Claim, No Drawings

PRODUCTION OF STERILE COMPOSITE EMULSION

FIELD OF THE INVENTION

The present invention relates to a sterile composite emulsion and a process for producing the same. More particularly, it relates to a sterile composite emulsion which can be stored for a longer period of time without putrefaction and can maintain a stable emulsion state during storage, and to a process for producing thereof. The term, "sterile" used herein means a state resulted from treatment under conditions of ultra-high temperature heating sterilization, but is not limited to the literal meaning of the term, "sterile".

BACKGROUND OF THE INVENTION

Natural fresh cream and analogous synthetic creams which have been hitherto used as whipping cream and coffee cream, and for cheese, pudding, frozen dairy desserts such as ice cream and soft frozen dairy products, as well as in cooking, for example, in salad dressings and soup are in oil-in-water (O/W) emulsions. In general, cream containing about 38 to 47% of fat has been widely used as whipping creams, and cream containing about 20 to 40% of fat has been widely used for coffee creams, frozen dairy desserts and cooking. Recently, with an increase in general demand for dietary food, cream having a lower fat content has been requested. However, when a fat content of cream is merely reduced, there is such a defect that cream has less taste and lacks rich mouthfeel. Particularly, for whipping cream, a possible reduction of a fat content is at most to about 20% by weight, and such a reduced fat content makes whipping difficult and requires a long period of time to obtain a sufficient whipped state. Further, the whipped product obtained has rough texture and inferior decoration properties, and causes a reverse phenomenon (self reemulsifying phenomenon), which results in poor shape retention. Moreover, overrun thereof is too high and causes defects such as puffy mouthfeel and watery taste.

In order to remove these defects, an attempt to utilize a large amount of an emulsifying agent or a polysaccharide has heretofore been done. However, it does not succeed in production of cream having a low fat content in satisfactory quality.

On the other hand, recently, it has been permitted to use a polyglycerin fatty acid ester as an emulsifying agent for food. Then, many processes for production of cream having a low fat content have been proposed. For example, there have been proposed a process which comprises preparing an O/W emulsion from an oil phase formed by adding a lipophilic polyglycerin fatty acid ester to a fat or an oil, stirring the emulsion to cause phase reversal to form a water-in-oil (W/O) emulsion, adding the W/O emulsion to an aqueous phase, and then mixing and emulsifying the emulsion to form a double emulsified water-in-oil-in-water (W/O/W) emulsion to reduce the fat content to about 20 to 30% (Japanese Patent Kokai No. 59-62340); and a process for producing coffee cream or whipping cream having a reduced fat content which comprises directly preparing a W/O emulsion by using the above oil phase, mixing and emulsifying it with an aqueous phase to form a double emulsified W/O/W emulsion (Japanese Patent Kokai No. 60-16542 or 60-16546). In such a double emulsified emulsion, even if its actual fat content is as low as 20%, its apparent fat content is increased up to 40%. Thus, it is possible to obtain an emulsion in the same quality as that of a conventional whipping O/W emulsion having a fat content of 40% by using a double emulsified emulsion having a fat content of 20%.

OBJECTS OF THE INVENTION

The present inventors have studied to prepare a W/O/W double emulsified emulsion based on the above prior art processes, and found that a double emulsified emulsion system is almost broken by treatment under conditions of ultra-high temperature heating sterilization.

Then, the present inventors have further studied intensively to stabilize a double emulsified emulsion system under conditions of ultra-high temperature heating sterilization. As the result, it has been found that a W/O/W sterile composite emulsion can be readily produced without breaking a double emulsified emulsion system by separately treating a primary emulsion and another aqueous phase under conditions of ultra-high temperature heating sterilization, and then mixing and homogenizing them under aseptic conditions.

The main object of the present invention is to provide a sterile composite emulsion useful for production of various food products, which can be stored for a longer period of time without putrefaction and can maintain a stable emulsion state during storage.

This object as well as other objects and advantages of the present invention will become apparent to those skilled in the art from the following description.

SUMMARY OF THE INVENTION

According to the present invention, there is provided a sterile composite emulsion comprising an aseptic homogeneous emulsified mixture of oil and/or aqueous phases, and a primary emulsion thereof, said oil and/or aqueous phases and said primary emulsion being separately treated by ultra-high temperature heating sterilization. The present invention also provides a process for producing a sterile composite emulsion which comprises separately treating oil and/or aqueous phases and a primary emulsion thereof by ultra-high temperature heating sterilization and then aseptically mixing, emulsifying and homogenizing them.

DETAILED DESCRIPTION OF THE INVENTION

The sterile composite emulsion of the present invention includes not only a double emulsified emulsion but also a triple or more higher multiple emulsified emulsion. However, a basic W/O/W emulsion will be mainly illustrated hereinafter.

In order to prepare the sterile composite emulsion of the present invention, firstly, a W/O emulsion is prepared as the primary emulsion by mixing and emulsifying an aqueous phase and an oil phase in the presence of an emulsifying agent, and treating the emulsion under ultra-high temperature heating sterilization conditions (hereinafter referred to as UHT treatment) such as heating at 130° to 150° C. for 2 to 60 seconds. The aqueous phase of the primary emulsion corresponds to the inner aqueous phase of the objective W/O/W emulsion.

As the oil phase used, there can be used any oil or an oil phase used for production of a conventional O/W emulsion. Examples of raw materials for the oil phase include vegetable oils such as rapeseed oil, soybean oil, sunflower oil, cottonseed oil, peanut oil, rice bran oil, corn oil, safflower oil, olive oil, kapok oil, sesame oil, evening primrose oil, palm oil, shea fat, sal fat, cacao butter, coconut oil, palm kernel oil and the like; and animal fats such as milk fat, tallow, lard, fish oil, whale oil and the like. In the present invention, these fats and oils can be used alone or in combination thereof. Further, there can be used processed oils of these fats and oils, for example, hardened, fractionated or interesterified products thereof. Particularly, in order to produce the composite emulsion having whipping properties, the oil phase preferably has a melting point of 28° to 40° C.

Examples of the emulsifying agent include lecithin, sucrose $C_{18-26}$ fatty acid ester, propylene glycol $C_{18-26}$ fatty acid ester, sorbitan $C_{18-26}$ fatty acid ester, glycerin $C_{14-24}$ fatty acid ester, an organic acid derivative of glycerin $C_{14-24}$ fatty acid ester, polyglycerin $C_{18-26}$ fatty acid ester, polyglycerin condensed ricinoleate and the like. They can be used alone or in combination thereof as needed. In the present invention, it is particularly preferred to use polyglycerin condensed ricinoleate and/or sucrose fatty acid ester having HLB of not more than 2, preferably, not more than 1 together with glycerin fatty acid ester and/or an organic acid derivative thereof. When polyglycerin condensed ricinoleate and/or sucrose fatty acid ester having HLB of not more than 2 are used in an amount of 0.1 to 5% by weight, preferably, 0.7 to 3% by weight, more preferably, 1.0 to 2.5% by weight based on the oil phase, and glycerin fatty acid ester and/or organic acid derivative thereof are used in an amount of 0.1 to 5% by weight, preferably 0.7 to 3% by weight based on the oil phase, an extremely stable emulsion state can be obtained. Particularly, when a sucrose fatty acid ester having HLB of not more than 2, preferably, not more than 1, the fatty acid component of which is mainly composed of $C_{18-26}$ unsaturated fatty acids is used, the resulting emulsion has excellent emulsion stability. Examples of the organic acid derivative of glycerin fatty acid ester includes succinic acid monoglyceride, citric acid monoglyceride, tartaric acid monoglyceride, diacetyl tartarate monoglyceride, malic acid monoglyceride and lactic acid monoglyceride. Among them, succinic acid monoglyceride is preferred.

The inner aqueous phase may be only water. However, in view of the production of a more stable W/O/W emulsion, it is preferred to use as the aqueous phase an aqueous solution prepared by addition of 0.5 to 70% by weight of a saccharide such as sucrose, glucose, sorbitol, maltose, corn syrup (DE value of not less than 20), a mixture thereof, etc. to water. Particularly, in order to obtain a whipping cream having less fat content, whipping ability is increased as increase in the amount of the saccharide.

The aqueous phase and the oil phase are successively mixed and emulsified. The mixing ratio can be determined according to a particular purpose but, in general, they are suitably mixed and emulsified in the ratio of the aqueous phase:the oil phase of 10 to 70:90 to 30.

As emulsification conditions, there can be preferably employed such conditions that water droplets become as small as possible. The conditions vary depending upon the amount of the materials to be emulsified and a particular type of a emulsifier to be employed and therefore can not be determined uniformly. However, for example, in the case of emulsification of the materials in the total amount of 100 kg by using a homomixer, the materials are stirred at a rate of about 1,000 to 2,000 rpm and, after UHT treatment, homogenized with a high pressure homogenizer at a pressure of 200 to 400 kg/cm$^2$ until sufficiently fine water droplets are formed in the emulsion.

As the apparatus for UHT treatment, there can be employed a direct heating type apparatus or an indirect heating type apparatus, and the latter is preferable for UHT treatment of the above primary emulsion. On the other hand, either direct or indirect heating type apparatus may be used for UHT treatment of the surrounding aqueous phase as hereinafter illustrated. The direct heating type apparatus includes, for example, Uperization sterilizer (manufactured by APV), VTIS sterilizer (manufactured by Alfa-Laval AB), Lagear UHT sterilizer (manufactured by Lagear), Paralyzator (manufactured by Pash and Silkevogue), CP. Vac-Heat UHT sterilizer (manufactured by Crimary Package), Ultra Therm (manufactured by Crepako), and the indirect heating type includes, for example, APV plate type UHT treatment apparatus (manufactured by APV), C.P. UHT sterilizer (manufactured by Crimary Package), Stalk tubular type UHT sterilizer (manufactured by Stalk), contherm scraping type UHT sterilizer (manufactured by Alfa-Laval AB) and the like.

Then, apart from the above-prepared W/O emulsion, an aqueous phase to which is added an emulsifying agent and/or an emulsion stabilizer is prepared and subjected to UHT treatment.

The aqueous phase of this stage corresponds to the surrounding aqueous phase of the objective W/O/W emulsion. Unlike the inner aqueous phase, the surrounding aqueous phase requires to use an emulsifying agent and/or an emulsion stabilizer. The emulsifying agent includes, for example, hydrophilic emulsifying agents such as polyglycerin $C_{12-26}$ fatty acid ester, sucrose $C_{12-26}$ fatty acid ester, lecithin, sorbitan $C_{12-26}$ fatty acid ester and the like. Particularly, according to the present invention, polyglycerin fatty acid ester having HLB of not less than 10 and/or sucrose fatty acid ester having HLB of 5 to 16 are preferred. The emulsion stabilizer includes, for example, various kinds of proteins or conjugated proteins such as sodium caseinate, soybean protein, skim milk powder, gelatin, glycoprotein and the like; polysaccharides such as starch, dextrin, sugars and the like; and various kinds of phosphates. Particularly, a combination of xanthan gum and hexametaphosphate are preferred. As described above, either direct or indirect heating may be employed for UHT treatment of this surrounding aqueous phase.

Then, the UHT-treated surrounding aqueous phase and the above-prepared UHT-treated W/O emulsion are mixed and emulsified under aseptic conditions so that the fat content of the objective W/O/W emulsion is 3 to 50% by weight, and then homogenized.

Particularly, in order to obtain a composite emulsion having whipping properties, the lowest limit of the fat content is preferably 10% by weight in view of obtaining a good whipped state. For the other applications such as for coffee cream or cooking, the fat content may be selected within the range of 3 to 50% by weight according to a particular purpose.

In order to carry out mixing, emulsification and homogenization under aseptic conditions, a tank and a homogenizer which have been previously sterilized with hot steam or with a suitable agent are used. As described for the production of the above W/O emulsion, emulsification conditions can not be uniformly determined because they vary according to a particular amount of materials to be emulsified and a particular type of an emulsifier. However, for example, in the case of emulsification of the materials in the total amount of 1,000 kg by using a stirrer, preferably, the materials is stirred at a rate of 1,500 rpm for about 10 minutes, then homogenized in a homogenizer at a pressure of 30 to 100 kg/cm². Of course, instead of such tank and homogenizer, for example, a line-mixer which meets above requirements can be used for a continuous treatment.

Subsequently, the emulsion was cooled, aged and packaged according to a conventional manner to obtain a desired end product.

The W/O/W emulsion thus obtained is a stable composite emulsion having extremely fine water droplets. For example, it has been confirmed by a microscopic observation of 600 magnifications of a sample of the emulsion that 1 to 6 water droplets can be seen within 2 to 1μ of the aqueous phase.

In the case of production of the triple emulsified composite emulsion of the present invention, firstly, an O/W emulsion is prepared in the presence of an emulsifying agent and then subjected to UHT treatment with a direct or indirect heating type apparatus. Separately, an oil phase is prepared by subjecting it to UHT treatment with an indirectly heating type apparatus. Further, separately, an aqueous phase is prepared by subjecting it to UHT treatment with a direct or indirect heating type apparatus. The above O/W emulsion is mixed and emulsified with the oil phase under aseptic conditions and homogenized to obtain a O/W/O emulsion, which is then mixed and emulsified with the aqueous phase under aseptic conditions and homogenized to obtain the objective triple emulsified composite emulsion. The more higher multiple composite emulsions can be prepared according to the similar process.

The above-described process is a general process and it is possible to make various modifications thereof. However, in any process, UHT treatment for the aqueous phase or the primary emulsion which is an O/W emulsion can be carried out by employing either direct or indirect heating type apparatus, though UHT treatment for the oil phase or the primary emulsion which is an W/O emulsion is preferably carried out by employing an indirect heating type apparatus. Thus, a double, triple or other more higher multiple emulsified sterile composite emulsion can be prepared by subjecting the oil phase and/or the aqueous phase and the primary emulsion to UHT treatment separately and mixing, emulsifying and homogenizing them under aseptic conditions.

As described above, according to the present invention, an industrially applicable process which can simply and readily produce a sterile composite emulsion with less breakage of the emulsion has been firstly established by subjecting the oil phase and/or the aqueous phase and the primary emulsion to UHT treatment, separately, and then mixing, emulsifying and homogenizing under aseptic conditions. Further, according to the present invention, the composite emulsion can be stored for a much longer period of time without putrefaction and can maintain a stable emulsion state during storage in comparison with a conventional composite emulsion.

The following Example and Comparative Example further illustrate the present invention in detail but are not to be construed to limit the scope thereof. In the Example and Comparative Example, all "parts" and "%'s" are by weight unless otherwise stated.

EXAMPLE 1

Hydrogenated palm oil having a melting point of 30° C. (950 parts) was heated to about 60° C. and it was admixed with polyglycerin condensed ricinoleate (40 parts) and succinic acid monoglyceride (20 parts) to obtain an oil phase. The resulting oil phase was stirred in a homomixer at a rate of 1,000 rpm. An aqueous solution (1,000 parts) prepared by dissolving glucose (200 parts) in water (800 parts) at about 60° C. was slowly added to the stirred oil phase and emulsified the resulting mixture to obtain an emulsion. The emulsion was sterilized through a contherm scraping type UHT sterilizer at 140° C., cooled and homogenized under a pressure of 200 kg/cm² to obtain a primary W/O emulsion with fine water droplets, which was subsequently placed in a sterile tank. Separately, water (7,400 parts) was admixed with skim milk powder (500 parts), decaglycerin monostearate (HLB=13) (80 parts), xanthan gum (10 parts) and hexametaphosphate (10 parts), heated to 60° to 70° C. to obtain an aqueous phase. Then, in the same manner as described above, the aqueous phase was subjected to UHT treatment, cooled and poured in the sterile tank. Subsequently, the aqueous phase and the above W/O emulsion were mixed, stirred at a rate of 600 rpm to effect emulsification, homogenized in a sterile homogenizer at a pressure of about 60kg/cm², cooled to 5° C. and subjected to aging.

The emulsion formation degree of the resulting W/O/W emulsion containing 10% oil was 85.5%. When it was stored at 5° C. for 3 months, the emulsion formation degree was 82%. [The emulsion formation degree was determined according to the method described in Oil Chemistry, 26 (10), 655 (1977)]. This composite emulsion had good emulsion state without showing plasticization. When this composite emulsion was whipped, the whipped product with overrun of 123% was obtained by whipping for 2.5 hours. The whipped product had good shape retention at 20° C. after 24 hours and had rich taste and excellent quality as whipping cream.

REFERENCE EXAMPLE 1

According to the same manner as described in Example 1, a W/O/W emulsion was obtained in the emulsion formation degree of 96.5% except that both primary W/O emulsion and aqueous phase were not subjected to UHT treatment. When the W/O/W emulsion was treated by UHT sterilization with a direct heating type apparatus, the emulsion formation degree of the emulsion was reduced to 7.5% and most of the double emulsified emulsion was broken. Likewise, when the W/O/W emulsion was treated by UHT sterilization with an indirect heating type apparatus, the emulsion formation degree of the emulsion was reduced to 19.5%.

What is claimed is:

1. A process for producing a sterile composite emulsion which comprises separately treating oil and/or aqueous phases and primary emulsion thereof by ultrahigh temperature heating sterilization at 130° to 150° C. for 2 to 60 seconds and then aseptically mixing, emulsifying and homogenizing them.

* * * * *